UNITED STATES PATENT OFFICE.

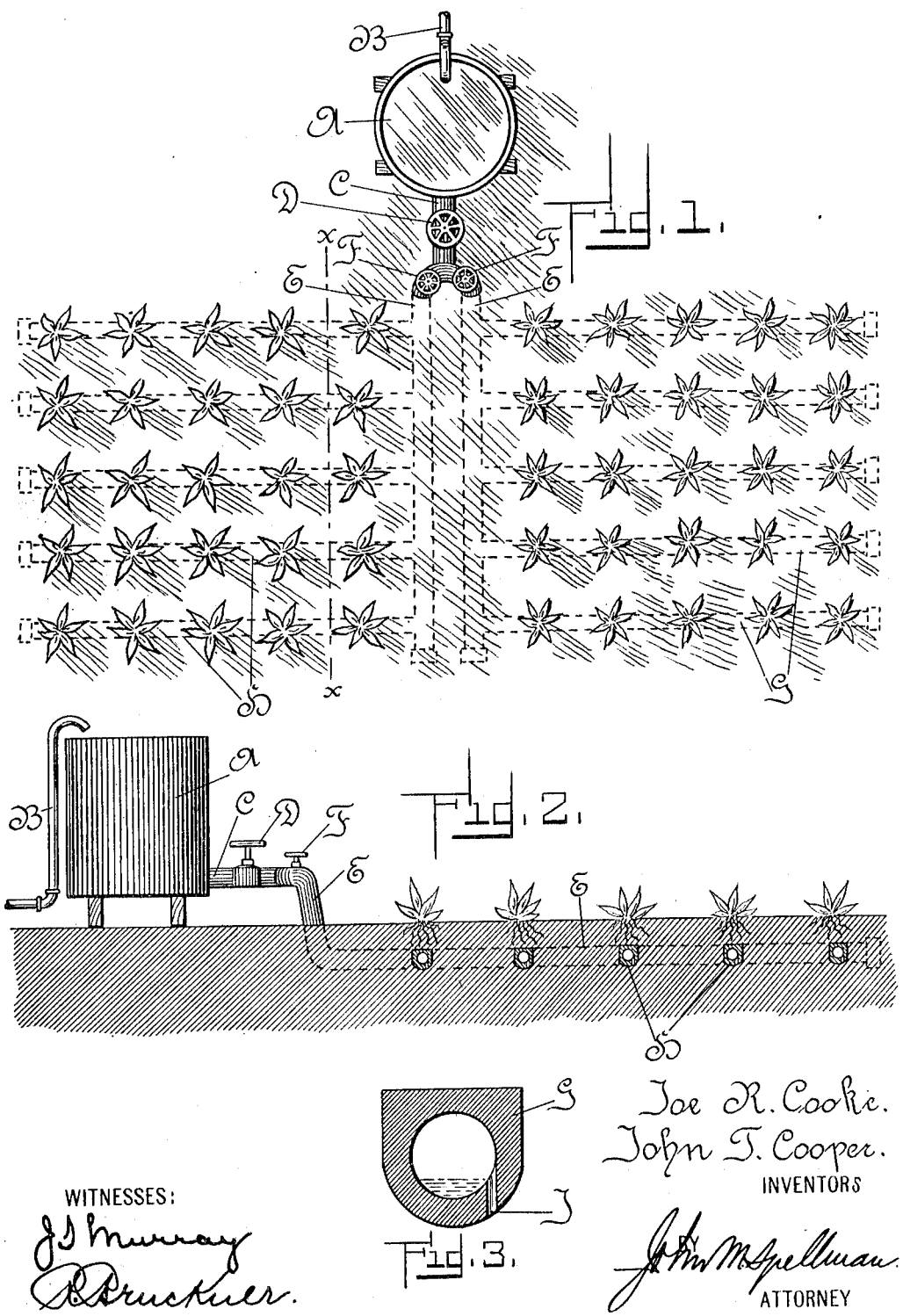

JOE R. COOKE AND JOHN T. COOPER, OF ALVARADO, TEXAS.

IRRIGATION-PIPE.

1,114,967.  Specification of Letters Patent.  Patented Oct. 27, 1914.

Application filed September 5, 1911. Serial No. 647,480.

*To all whom it may concern:*

Be it known that we, JOE R. COOKE and JOHN T. COOPER, citizens of the United States, residing at Alvarado, in the county of Johnson and State of Texas, have invented certain new and useful Improvements in Irrigation-Pipes, of which the following is a specification.

Our invention relates to an improved irrigation pipe which is to be used in connection with a sub-irrigation system, and the principal object is to so construct the pipe that earth will be prevented from packing about the pipe to such an extent as to clog the openings in the pipe through which water passes.

Another object is to provide a pipe which can be cheaply manufactured and which will be strong, durable, simple, and efficient, and not likely to get out of working order.

This invention is illustrated in the accompanyng drawings wherein—

Figure 1 is a plan view of a sub-irrigation system with which the improved pipe may be used; Fig. 2 is a sectional view taken along the line $x$—$x$ in Fig. 1; Fig. 3 is an enlarged sectional view through one of the irrigation pipes shown in Fig. 1.

The construction of the improved irrigation pipe is clearly disclosed in Figs. 2 and 3 of the accompanying drawings, and in Fig. 1 there is shown a system with which the improved pipe can be used.

Referring to Fig. 1, the numeral A indicates a supply tank which is filled by means of a supply pipe B. An outlet pipe C leads from the lower end portion of the tank A, and is provided with a valve D so that the flow of water through the pipe C into the distributing mains E may be controlled. Each of these mains E is provided with a valve F to permit the mains to be separately controlled, and thus the water permitted to flow through one of the mains into the branch pipes G or H without the water flowing through the second main. Referring more particularly to Figs. 2 and 3, it will be seen that each of these branch pipes is provided with a flat upper face and with straight side walls which merge into a curved base. By having the upper face flat and relatively wide, the weight of the earth in which the branch pipes are embedded is disposed upon the upper faces of the pipes. Since the upper faces of the pipes are relatively wide and extend beyond the points at which the lower faces of the pipes rest, the earth will be prevented from packing about the bottom of the pipes and clogging the apertures J which are formed in the pipes, as shown in Fig. 3. The water which flows through the pipes G can therefore freely drain through the apertures J and saturate the earth, thus irrigating the field. These pipes may be formed of any suitable material such as metal, cement, or any other desired material according to the wishes of the person manufacturing the pipes.

We have therefore provided a pipe which is so constructed that the apertures G are not liable to be clogged up, thus preventing the water in the pipes from passing out of the same into the field. It will also be noted that the pipe is so constructed that it may be cheaply manufactured and readily set up. It will also be noted that this pipe will not be liable to quickly get out of order, and that therefore, it will not be necessary to be continually making repairs to the irrigating system.

Having thus described the improved pipe, what is claimed is:

A one piece irrigation pipe having a relatively wide flat upper face and having straight side faces merging into a rounded bottom, the pipe being provided with a longitudinally-extending conducting bore and with outlet openings formed in the side of the curved bottom of said pipe and extending parallel to the straight side faces of said pipe.

In testimony whereof we have signed our names to this specification in the presence of two subscribing witnesses.

JOE R. COOKE.
JOHN T. COOPER.

Witnesses:
EARNEST BALL,
JAMES FRY.

Copies of this patent may be obtained for five cents each, by addressing the "Commissioner of Patents, Washington, D. C."